(12) United States Patent
Laflotte et al.

(10) Patent No.: US 11,952,870 B2
(45) Date of Patent: Apr. 9, 2024

(54) METHOD FOR CONSTRUCTING AND EXPLOITING A HYDROCARBONS PRODUCTION FACILITY, NOTABLY ON AN EXPANSE OF WATER, AND ASSOCIATED EXPLOITATION FACILITY

(71) Applicant: TECHNIP FRANCE, Courbevoie (FR)

(72) Inventors: Benoit Laflotte, Rueil Malmaison (FR); Sylvain Vovard, Louveciennes (FR); Dominique Claude Jean Gadelle, Rueil Malmaison (FR)

(73) Assignee: TECHNIP FRANCE, Courbevoie (FR)

( * ) Notice: Subject to any disclaimer, the term of this patent is extended or adjusted under 35 U.S.C. 154(b) by 431 days.

(21) Appl. No.: 17/417,025

(22) PCT Filed: May 21, 2019

(86) PCT No.: PCT/EP2019/063113
§ 371 (c)(1),
(2) Date: Jun. 21, 2021

(87) PCT Pub. No.: WO2020/126121
PCT Pub. Date: Jun. 25, 2020

(65) Prior Publication Data
US 2022/0074287 A1 Mar. 10, 2022

(30) Foreign Application Priority Data
Dec. 21, 2018 (FR) ........................................ 1873966

(51) Int. Cl.
*F25J 1/00* (2006.01)
*E21B 43/01* (2006.01)
*F25J 1/02* (2006.01)

(52) U.S. Cl.
CPC ............. *E21B 43/01* (2013.01); *F25J 1/0022* (2013.01); *F25J 1/0247* (2013.01); *F25J 1/0259* (2013.01); *F25J 1/0296* (2013.01)

(58) Field of Classification Search
CPC ....... E21B 43/01; E21B 43/017; F25J 1/0022; F25J 1/0247; F25J 1/0259; F25J 1/0296; F25J 1/0297
See application file for complete search history.

(56) References Cited

U.S. PATENT DOCUMENTS

| 2006/0000615 | A1* | 1/2006 | Choi | F25J 1/0022 |
| | | | | 166/352 |
| 2014/0053599 | A1* | 2/2014 | Byfield | F25J 1/0022 |
| | | | | 29/890.035 |
| 2017/0097189 | A1 | 4/2017 | Guy et al. | |

FOREIGN PATENT DOCUMENTS

| AU | 2013202033 A1 | 10/2014 |
| CN | 1405523 A | 3/2003 |

(Continued)

OTHER PUBLICATIONS

Chinese Offce Action dated Oct. 26, 2022, issued during the prosecution of Chinese Patent Application No. CN 201980089196. 7, 16 pages.

(Continued)

*Primary Examiner* — Miguel A Diaz
(74) *Attorney, Agent, or Firm* — Locke Lord LLP; Gabrielle L. Gelozin; Christopher J. Capelli

(57) ABSTRACT

The method comprises supplying, at a construction site, of a functional module comprising a hybrid cooler; verifying onsite the exploitation of the equipment of the functional module; mounting the functional module on a support structure; moving the structure to an exploitation site on the expanse of water. The verification involves passing a flow to be cooled through the air cooler of the hybrid cooler, the (Continued)

flow being cooled exclusively by a flow of air circulating through the air cooler of the hybrid cooler. The exploitation of hydrocarbons on the expanse of water involves the passage of a flow to be cooled through the water cooler of the hybrid cooling system, the flow being cooled by heat exchange with water taken from the expanse of water circulating through the water cooler.

20 Claims, 9 Drawing Sheets

(56) References Cited

FOREIGN PATENT DOCUMENTS

| WO | 2018141725 A1 | 8/2018 | |
|---|---|---|---|
| WO | 2018215838 A2 | 11/2018 | |
| WO | WO-2018209399 A1 * | 11/2018 | ............. F25J 1/0022 |
| WO | WO-2019110770 A1 * | 6/2019 | ............... E04H 5/02 |

OTHER PUBLICATIONS

International Search Report and Written Opinion Issued in PCT/EP2019/063113 dated Sep. 18, 2019.
Search Report Issued in FR 18 73966 dated Nov. 4, 2019.

* cited by examiner

METHOD FOR CONSTRUCTING AND EXPLOITING A HYDROCARBONS PRODUCTION FACILITY, NOTABLY ON AN EXPANSE OF WATER, AND ASSOCIATED EXPLOITATION FACILITY

CROSS REFERENCE TO RELATED APPLICATIONS

This application is a U.S. National Phase Application filed under 35 U.S.C. § 371, based on International PCT Patent Application No. PCT/EP2019/063113, filed May 21, 2019, which application claims priority to French Patent Application No. 1873966 filed on Dec. 21, 2018. The contents of these applications are incorporated herein by reference in their entirety.

BACKGROUND

1. Field

The present invention relates to a method for constructing and exploiting a hydrocarbon production facility on a body of water, comprising the following steps:
- supply, at a construction site, of at least one functional module comprising equipment and at least one hybrid cooling system comprising an air cooler and a water cooler, in series or in parallel;
- verifying onsite the exploitation of the equipment of the functional module;
- mounting the functional module on a support structure at least partially immersed in the body of water;
- moving the support structure carrying the functional module on the body of water to a exploitation site;
- exploitation of hydrocarbons on the body of water.

The facility is, for example, a floating production, storage and offloading unit (FPSO), a floating liquefied natural gas unit (FLNG) or, more generally, an offshore unit such as a semi-submersible platform, which may, for example be a TLP (Tension Leg Platform), an unloading buoy, a floating vertical column or a ship. In a variant, the facility is a fixed rigid structure of the platform or "gravity" type, for example a GBS (Gravity Based Structure).

2. Description of Related Art

Floating units of the above type generally comprise a floating hull carrying a large amount of interconnected equipment. This equipment is for example connected to each other by pipes, functional lines, such as electrical lines, hydraulic transfer lines, and/or information transfer lines.

To manufacture such a unit, it is known to assemble the hull, and to place different modules, separately prefabricated, on the hull. Once placed on the hull, the modules are interconnected with each other to make the different facility systems.

The disadvantage of such a solution is that it requires many interconnections between the modules. These interconnections generally increase the weight of the structure and its size.

In addition, the planning and construction of such a structure is complex, time consuming and costly. This is because while each of the individual modules can be manufactured separately at a construction site, the modules are not capable of functioning separately from each other on the job site. The majority of the pre-commissioning activities and tests that need to be performed on each module can only be performed after the modules have been interconnected to their support structure.

As a result, the functionality of each module can only be tested once all the modules are installed, in a very confined and interdependent environment.

Thus, if a particular malfunction occurs on one module, the tests that must be performed on other modules can be disrupted, which can lead to significant delays in the production launch of the facility.

On the other hand, some of these tests require the availability of seawater to operate the cooling system. This availability typically requires the offshore structure to be placed at its final destination, delaying the finalization of these tests to the last moment before startup.

AU2013202033 describes a method of the aforementioned type, in which modules are tested directly onshore, onsite, and are subsequently appropriately positioned on a floating support.

SUMMARY

An object of the invention is to obtain a method of constructing and exploiting a fluid production facility that significantly reduces the time required for construction and commissioning, while providing optimized space requirements and maximum efficiency.

To this end, the invention has as its object a method of the aforementioned type, characterized in that the onsite verification of the exploitation of the equipment of the functional module comprises the passage of at least one flow to be cooled through the air cooler of the hybrid cooling system, the flow being cooled exclusively by an air flow circulating through the air cooler, without activation of a water cooler of the hybrid cooling system, the exploitation of hydrocarbons on the body of water comprises the passage of at least one flow to be cooled through the water cooler, the flow being cooled by direct or indirect heat exchange with water taken from the body of water circulating through the water cooler.

The particular use of a hybrid cooling system, in which the field verification phases are performed exclusively using air cooling and the exploitation phases are preferably performed using mixed air-water cooling, reduces the time required for field testing, while limiting the space requirement and increasing efficiency during exploitation.

The method according to the invention may comprise one or more of the following features, taken alone or in any technically feasible combination:
- the direct heat exchange is a heat exchange without contact with seawater from the body of water, or the indirect heat exchange is performed via a closed loop of fresh water that is cooled by seawater from the body of water;
- when exploiting hydrocarbons on the body of water, the flow to be cooled is cooled exclusively by the water circulating through the water cooler, without cooling by an air flow circulating through the air cooler;
- the flow to be cooled is an exploited hydrocarbon flow or is a coolant flow of fluid intended to enter into a heat exchange relationship with an exploited hydrocarbon flow;
- the functional module is a single functional module comprising at least one pretreatment unit, a power facility, utilities, a liquefaction unit and/or a hydrocarbon storage management unit;

the facility comprises a plurality of functional modules, the method comprising mounting the plurality of functional modules on the support structure, and connecting the functional modules to each other by a connection interface comprising at least one connection line between the functional module and at least one other functional module, the connection line being an exploited fluid transfer line, an electrical power transfer line, a hydraulic fluid transfer line and/or an information transfer line;

the connection interface comprises at most 50 connection lines;

one functional module is a hot functional module, with at least one functional module being a cold functional module connected to the hot functional module;

the hot functional module comprises a hydrocarbon pretreatment unit, a power facility, and/or utilities;

the cold functional module comprises a liquefaction unit and/or a hydrocarbon storage management unit;

a functional module comprises a power facility and/or utilities;

the hybrid cooling system is connected to an outlet of a compressor of the flow to be cooled, the method comprising, during verification onsite and/or during exploitation, compressing the flow to be cooled in the compressor, before cooling it in the hybrid cooling system;

the functional module comprises at least one technical building, in particular an electrical room or an instrumentation room, which can interact specifically with the functional module equipment, the onsite verification of the functioning of the equipment of the functional module comprising the activation of the technical building specific to the functional module;

the onsite verification of the functioning of the equipment is carried out before the functional module is mounted on the support structure;

the support structure comprises a hull, the facility being an FPSO or a FLNG or the support structure is a platform, in particular a SPAR or GBS platform;

one functional module, advantageously each functional module, comprises a torch and, at least one functional module has a mass of more than 6,000 metric tons, in particular more than 10,000 metric tons, in particular more than 20,000 metric tons.

The invention also has as its object a facility for producing hydrocarbons on a body of water comprising:

a support structure;

at least one functional module comprising equipment and at least one hybrid cooling system comprising an air cooler and a water cooler, in series or in parallel, the functional module being mounted on the support structure;

at least one assembly for supplying a flow to the functional module, the flow being suitable for passing through the water cooler and/or through the air cooler of the hybrid cooling system and, a control unit suitable for controlling the hybrid cooling system, between a configuration for verifying the functioning of the functional module at a construction site, in which at least one air cooler of the hybrid cooling system is selectively activated to cool a flow to be cooled without activating a water cooler of the hybrid cooling system, and a configuration for hydrocarbon exploitation on the body of water, in which the water cooler is connected to the water of the body of water, to make water from the body of water circulate in the water cooler and cool the flow to be cooled passing through the water cooler.

The facility according to the invention may comprise one or more of the following features, taken alone or in any technically possible combination:

at least one functional module has a mass of more than 6,000 metric tons, in particular more than 10,000 metric tons, in particular more than 20,000 metric tons;

the functional module, upstream of the cooling system, comprises at least one compressor intended to compress the flow intended to be cooled in the cooling system.

BRIEF DESCRIPTION OF THE FIGURES

The invention will be better understood from the following description, given only by way of example, and made with reference to the attached drawings, in which.

DETAILED DESCRIPTION

A first hydrocarbon production facility 10 on a body of water 12 is illustrated in FIGS. 1 through 6.

The facility 10 is intended in particular for the exploitation of hydrocarbons such as oil or/and natural gas, the hydrocarbons being collected at the bottom of the body of water 12 and brought to the surface of the body of water 12.

The facility 10 is for example a floating production, storage and offloading (FPSO) unit or a floating liquefied natural gas (FLNG) unit, a semi-submersible platform, for example a tension leg platform (TLP), an offloading buoy, a floating vertical column or a ship. In a variant, the facility 10 is a fixed rigid structure of the platform or "gravity" type, for example a GBS (Gravity Based Structure).

The body of water 12 is for example a lake, a sea or an ocean. The depth of the body of water 12 in front of the facility 10 is between 50 m and 3000 m, for example, or even 4000 m.

Figure 1:
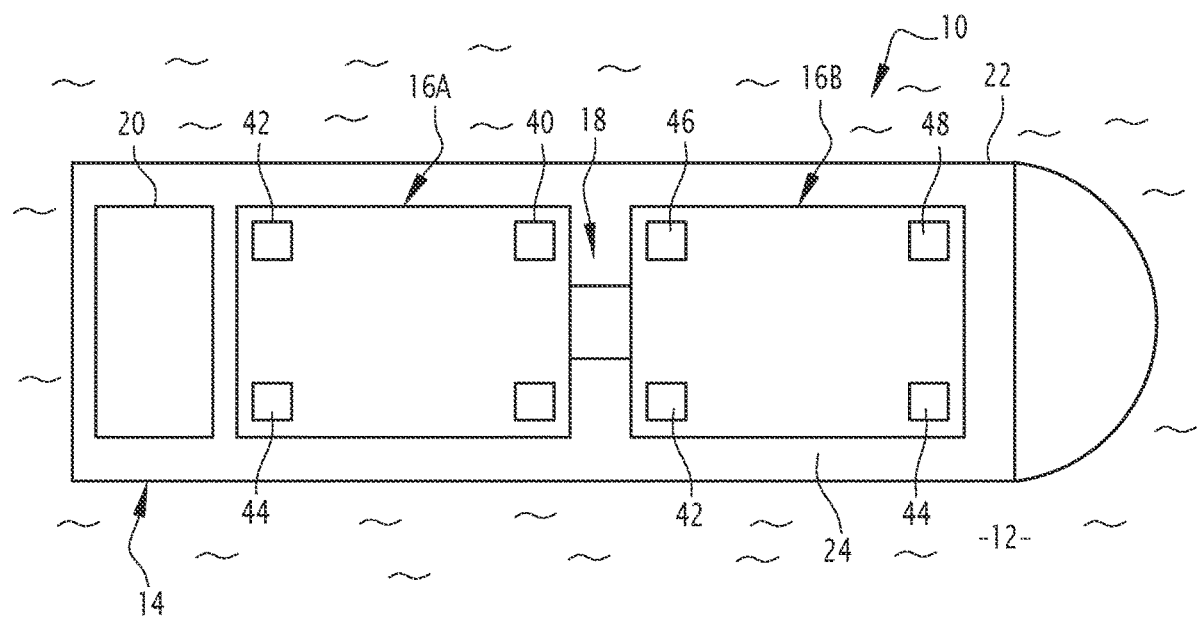
FIG. 1 is a schematic top view of a first hydrocarbon production facility according to the invention.

With reference to FIG. 1, the facility 10 comprises a support structure 14 partially submerged in the body of water 12, and at least one functional module, here at least a first functional module 16A and a second functional module 16B, carried by the support structure 14.

The facility 10 further comprises an interface 18 for connection between the functional modules 16A, 16B. Advantageously, it comprises a living area 20 also carried by the support structure 14.

The support structure 14 is floating on the body of water 12, for example, or is fixedly mounted in the body of water 12. It is formed by a shell 22 floating on the body of water, for example.

The support structure 14 has an upper surface 24 forming a deck on which the functional modules 16A, 16B are mounted. It optionally comprises a control system (not shown), suitable for adjusting the height of the upper surface 24 with respect to the body of water 12 and of maintaining the upper surface 24 substantially horizontal, even if the load applied to the upper surface 24 is inhomogeneous, and regardless of tidal variation. The control system is a selective ballasting system, for example.

Advantageously, the support structure 14 contains fluid reservoirs placed below the upper surface 24.

Each functional module 16A, 16B groups together equipment capable of functioning in an integrated manner to perform a function, in particular to form at least one unit in the implementation of a hydrocarbon exploitation method.

Each functional module 16A, 16B, here has a significant mass to comprise all the equipment intended to perform the function. The mass of each functional module 16A, 16B is advantageously more than 6,000 metric tons, in particular more than 10,000 metric tons, in particular more than 20,000 metric tons. The functional module 16A, 16B is advantageously designated by the term "mega-module".

Figure 2:
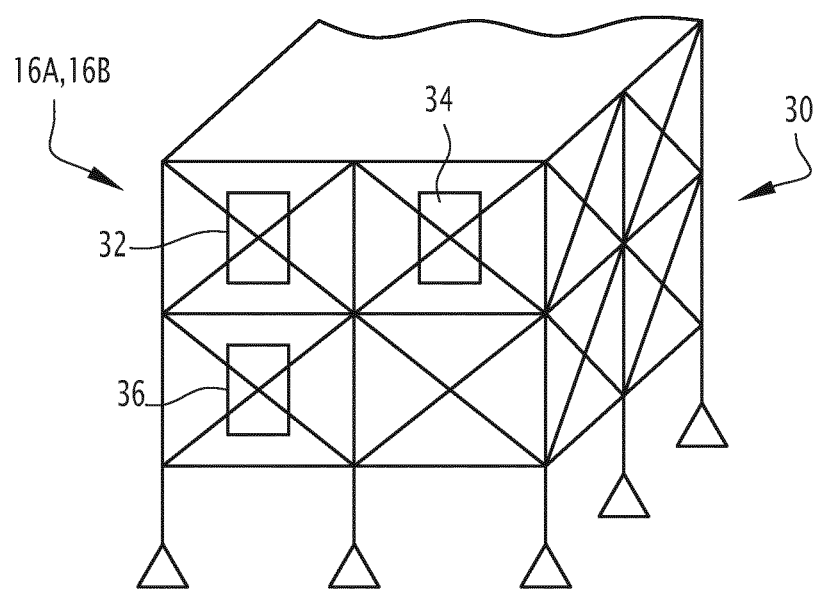
FIG. 2 is a schematic three-quarter view of a first functional module of the facility of FIG. 1.

With reference to FIG. 2, each functional module 16A, 16B comprises a support frame 30 and equipment 32 supported by the frame 30 to perform the function.

At least one module 16A, 16B comprises a hybrid cooling system 34 for selective use during construction and during exploitation of the functional module 16A, 16B. In the example shown in FIGS. 2 and 3, each functional module 16A, 16B further comprises a technical building 36, consisting of an electrical room and/or an instrumentation room.

The equipment 32 comprises functional systems, for example, such as mechanical equipment (overhead cranes, monorails, carts), process equipment such as capacities, compressors, heat exchangers, expansion turbines, expansion valves, flow, temperature, level or pressure control valves, pumps, fluid transport lines, or functional lines, such as electrical power transport lines, hydraulic fluid transport lines, or/and information transport lines.

The technical building 36 is connected to the equipment 32 of the functional module 16A, 16B to provide the exploitation and monitoring of the equipment 32, and is advantageously connected to a control room 38 (see FIG. 3) common to one or more modules 16A, 16B, for receiving the control commands for the equipment 32 to function.

Figure 3:
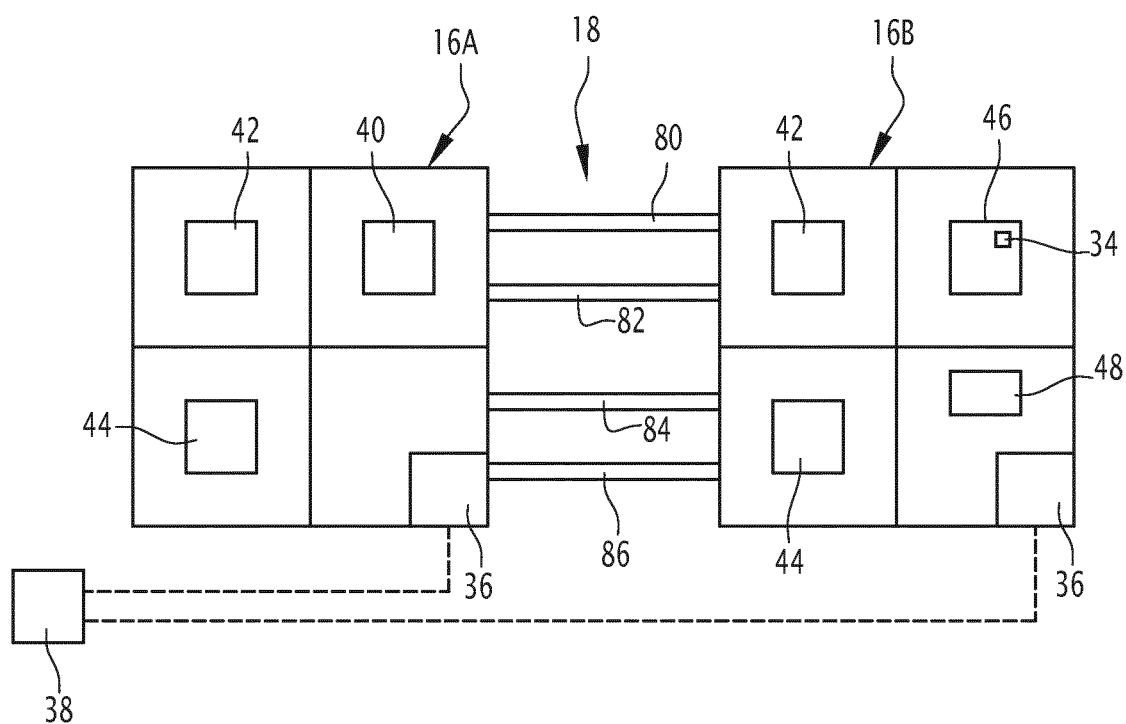
FIG. 3 is an enlarged schematic top view, illustrating each of the functional modules of the facility of FIG. 1, and the interface between two functional modules.

In the example shown in FIGS. 1 to 3, the facility 10 comprises a first "hot" functional module 16A and a second "cold" functional module 16B.

With reference to FIG. 3, the hot functional module 16A comprises at least one pretreatment unit 40, a power plant 42, and utilities 44.

The pretreatment unit 40 is intended to treat at least one hydrocarbon flow extracted from the subsoil, for example, to purify the hydrocarbon flow and decrease the amount or remove undesirable compounds in the hydrocarbon flow. The undesirable compounds are for example water, carbon dioxide, sulfur compounds such as mercaptans, or heavy hydrocarbons such as hydrocarbons having 5 or more carbon atoms.

The pretreatment unit 40 thus advantageously comprises at least one distillation column and/or a purification bath and/or a cooling system and/or adsorption capabilities for undesirable compounds.

The power plant 42 is intended to produce the necessary electrical power for the consumption of the pretreatment unit 40. It comprises at least one electrical generator and advantageously a cooling system.

The utilities 44 comprise utility fluid sources. Examples of utility fluid are water, steam, air, nitrogen.

The utilities 44 are suitable for preparing, conditioning, and supplying the utility fluids to the pretreatment unit 40 at the desired rate.

The cold functional module 16B comprises at least one liquefaction unit 46, a liquefied fluid storage management unit 48, a power plant 42 and/or utilities 44.

The liquefaction unit 46 is intended to receive a hydrocarbon flow, in particular a natural gas flow containing more than 50% methane in gaseous form, and to cool this flow in order to liquefy it.

Figure 4:
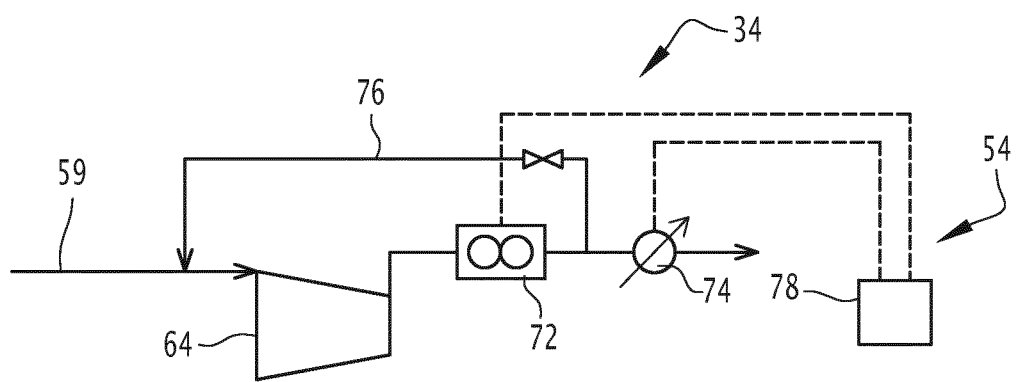
FIG. 4 is a schematic view of a first hybrid cooling system used in the facility of FIG. 1.
Figure 5:
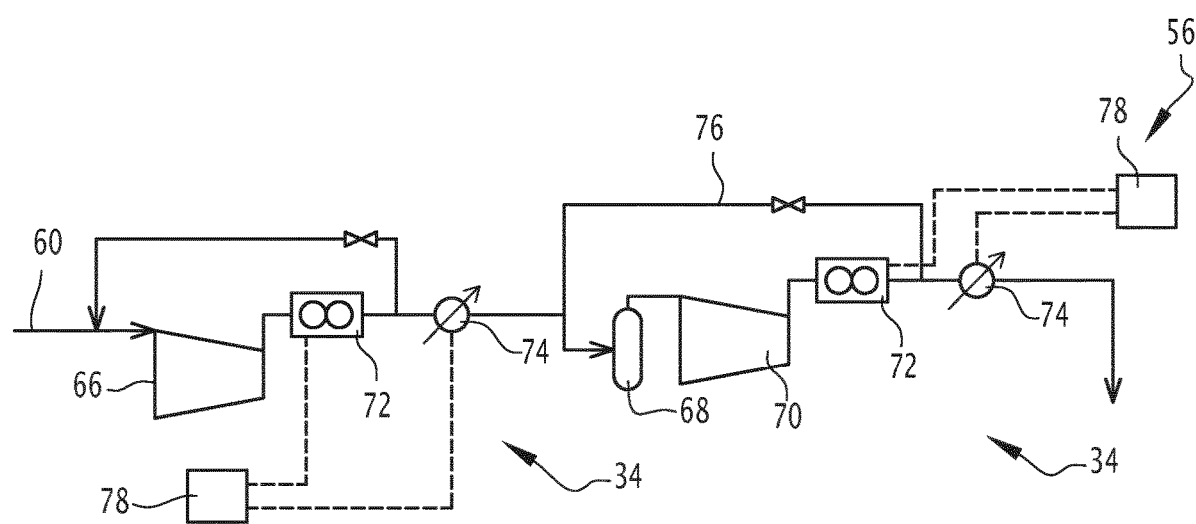
FIG. 5 is a view similar to FIG. 4 of a second hybrid cooling system used in the facility of FIG. 1.
Figure 6:
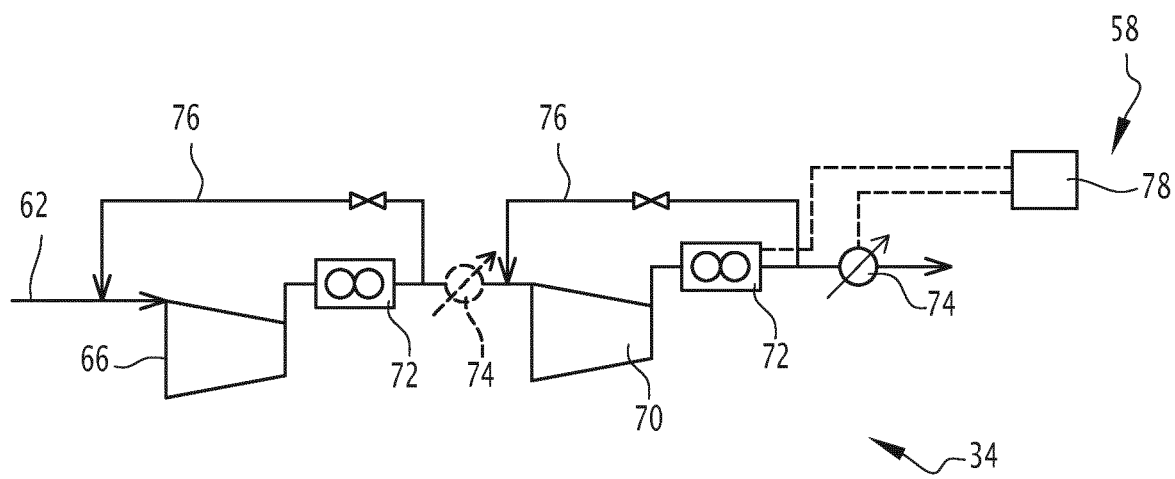
FIG. 6 is a view similar to FIG. 4 of a third hybrid cooling system used in the facility of FIG. 1.
Figure 7:
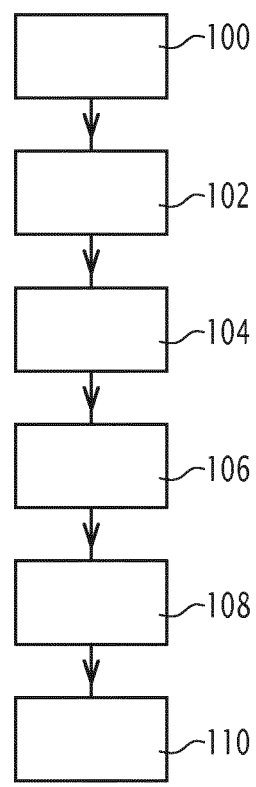
FIG. 7 is a flow chart illustrating the various steps in the construction and exploitation method of the facility of FIG. 1.

Advantageously, with reference to FIG. 4, the liquefaction unit 46 comprises a system 54 for compressing the gaseous hydrocarbon flow 59 and at least one thermal cycle 56, 58 for cooling the hydrocarbon flow, each containing a cooling fluid 60, 62 (shown partially in FIGS. 5 and 6 respectively). The cooling fluids 60, 62 are intended to enter into a heat exchange relationship without contact with the hydrocarbon flow in at least one heat exchanger (not shown).

In the example shown in FIG. 4, the compression system 54 comprises a compressor 64 intended for receiving a hydrocarbon flow, and, downstream of the compressor 64, a hybrid cooling system 34.

In the example illustrated in FIG. 5, the first cooling 60 is comprised of a hydrocarbon mixture.

The first thermal cycle 56 comprises a first compressor 66, for compressing the first cooling fluid 60, a hybrid cooling system 34 at the outlet of the first compressor 66. It also comprises a separator tank 68 and a second compressor 70 and another hybrid cooling system 34, placed downstream of the second compressor 70.

In the example shown in FIG. 6, the second cooling fluid 62 is also a hydrocarbon mixture.

The second thermal cycle 58 comprises a first compressor 66 followed by an air cooler 72. It comprises a second compressor 70 downstream of the air cooler 72, and a hybrid cooling system 34 mounted downstream of the second compressor 70.

In the variant in FIG. 6, shown in dotted line, the air cooler 72 is supplemented by a water cooler 74 to form another hybrid cooling system 34.

With reference to FIGS. 4-6, each hybrid cooling system 34 comprises an air cooler 72 and a water cooler 74 in series.

Each cooler 72, 74 is intended to receive the flow to be cooled and to exchange thermally with that flow, to cool it.

The air cooler 72 is thus suitable for making a gaseous flow circulate, in particular an air flow, to bring the gaseous flow circulating through the cooler 72 into a heat exchange relationship, without contact, with the flow to be cooled.

The water cooler 74 is suitable for bringing the flow circulating through the cooler 74 into a heat exchange relationship, without contact, with the water taken from the body of water 12.

The cooling can be provided by direct heat exchange with seawater taken from the body of water 12 or by indirect heat exchange, via a closed fresh water loop which is itself cooled by seawater from the body of water 12. The seawater supply may be dedicated to each module 16A, 16B.

In the example shown in the Figures, each hybrid cooling system 34 further comprises an excess fluid purge line 76 tapped between the air cooler 72 and the water cooler 74 to divert a portion of the cooled flow into the air cooler 72 and reintroduce it upstream of the respective compressor 64, 66, 70, located upstream of the air cooler 72.

Each hybrid cooling system 34 comprises a control unit 78 suitable for controlling the hybrid cooling system 34, between a configuration for verifying the functioning of the functional module 16A, 16B at a construction site, in which the air cooler 72 is selectively activated to cool the flow passing through the air cooler 72 without activating any water cooler 74, and a hydrocarbon exploitation configuration on the body of water 12, wherein the water cooler 74 is connected to water in the body of water 12, to have water circulate from the body of water 12 through the water cooler 74 and cool the flow through the water cooler 74.

The control unit comprises at least one isolation valve, preferably a plurality of isolation valves suitable for controlling the air and water flows passing through the air cooler 72 and the water cooler 74.

As will be seen below, this enables testing the functioning of each module 16A, 16B independently of the other modules 16A, 16B, without the need to use water cooling from the body of water 12, in particular making the compressor 64, 66, 70 self-sufficient during the field verification phases. Instead, during the hydrocarbon production, at least the water cooler 74 is supplied with water from the body of water 12, to provide maximum cooling efficiency and thus increase production.

In the particular example shown in FIGS. 4-6, only four hybrid refrigeration systems 34 are used within the facility 10, downstream of the compressors 64, 66, 70 of the liquefaction unit 46.

The connection interface 18 comprises at least one connection line between the functional module 16A and the functional module 16B. The connection line is a line 80 for conveying fluid used, an electrical power transport line 82, a hydraulic fluid transport line 84 or/and an information transport line 86.

Given the organization of the equipment 32 in the functional modules 16A, 16B, and the autonomy of each functional module 16A, 16B with respect to the other functional modules 16A, 16B, the total number of connection lines (lines 80 and/or lines 82 to 86) connecting two functional modules 16A, 16B to each other is small.

This number is less than 50, for example, in particular less than 30 and in particular between 5 and 20.

Thus, connecting the functional modules 16A, 16B together is very simple after the functional modules 16A, 16B are arranged on the support structure 14.

A method of constructing and operating the hydrocarbon production facility 10 on the body of water 12 will now be described.

Initially, the method comprises the manufacturing of each functional module 16A, 16B, independently of each other, at one or more onshore sites.

During this manufacturing, the equipment 32 is assembled in the support frame 30.

The hybrid cooling system 34, when present, is installed in the support frame 30. Similarly, the technical building 36 is mounted to be operational in the functional module 16A, 16B.

Thus, in this step 100, functional modules 16A, 16B are provided at one or more onshore sites.

Next, the method comprises a step of verifying 102, the exploitation of the equipment 32 of the functional module 16A, 16B onsite. In particular, when the functional module 16A, 16B comprises a compressor 64, 66, 70, the compressor is turned on. A test fluid is passed through the compressor 64, 66, 70.

During this test, the control unit 78 controls each cooling system 34, to selectively activate the air cooler 72 without activating any water coolers 74. The water coolers 74 are not connected to the body of water 12.

In particular, in the liquefaction unit 46 of the module 16B, the discharge cooling of the compressors 64, 66, 70, is provided by each air cooler 72, without the use of the water coolers 74.

The flow to be cooled passes through the air cooler 72 and the water cooler 74, but is cooled exclusively in the air cooler 72, by air circulation.

Each compressor 64, 66, 70 operates independently, without the need to assemble the modules 16A, 16B with each other, or on the support structure 14.

Thus, the steps of checking the functioning of the equipment 32 of each functional module 16A, 16B can be conducted independently of the checks performed on another module 16A, 16B. If a failure or defect occurs on a piece of equipment 32 of one module 16A, 16B, this does not slow down the checks to be performed on the other modules 16A, 16B.

Before each module 16A, 16B is mounted on the support structure 14, each hybrid cooling system 14 thus operates exclusively with the air cooler 72, with no water cooler 74 active.

Next, in step 104, each functional module 16A, 16B is mounted on the support structure 14. For this, the support structure 14 is brought to the vicinity of the work site.

Each functional module 16A, 16B is moved onto the support structure 14 by a crane, for example, or if its weight is too great, by a placement method such as that described in the Applicant's application WO 2018/141725.

Each functional module 16A, 16B is then attached to the support structure 14. The connection interface 18 between the functional modules 16A, 16B is then set up.

In step 106, the functioning of each interface 18 is tested, and then the overall functioning of the system 10 is also tested, once the functional modules 16A, 16B are connected by the interfaces 18.

As before, the control unit 78 of each hybrid cooling system 34 controls each air-cooled cooler 72 to be active, with the water-cooled cooler 74 being kept inactive and not connected to the body of water.

Next, the method comprises a step 108 of moving the support structure 14 carrying each functional module 16A, 16B over the body of water 12 to an exploitation site.

The facility 10 is then connected to a hydrocarbon source, such as hydrocarbon production wells located on the bottom of the body of water or hydrocarbon tanks.

The method then comprises a step 110 of hydrocarbon exploitation on the body of water 12. In this step, a hydrocarbon flow is fed into the functional module 16A to be pretreated in the pretreatment unit 40. Then, the pretreated hydrocarbon flow transits through the interface 18 to be fed into the liquefaction unit 46 of the module 16B.

In the module 16B, the hydrocarbon flow is compressed in the compression system 54 and is liquefied by contactless heat exchange with the cooling fluids 60, 62 circulating through the thermal cycles 56, 58.

The liquefied flow is then sent to the storage management unit 48 to allow it to be stored and discharged into at least one tank in the facility 10 or transferred to a hydrocarbon transport barge.

During this exploitation step 110, each water cooler 74 is connected to the body of water 12.

The control unit 78 controls each water cooler 74, to switch it to its hydrocarbon exploitation configuration in which it provides cooling by heat exchange with water from the body of water 12. This precools the hydrocarbon flow and cools the cooling fluids 60, 62 exiting the respective compressors 66, 70 to liquefy the hydrocarbon flow.

Cooling by water from the body of water 12, advantageously taken from depth allows for colder cooling temperatures, in particular below 20° C.

This is optimal, especially for the liquefaction of natural gas, since the temperature of the cooling water is cold and stable. The production of liquefied natural gas is thus maximized.

The method according to the invention, implemented in the facility 10 is therefore particularly efficient, since it allows for independent construction and verification of each module 16A, 16B constituting the facility 10, limiting delays, while providing maximum production when the facility 10 is in exploitation.

Figure 8:
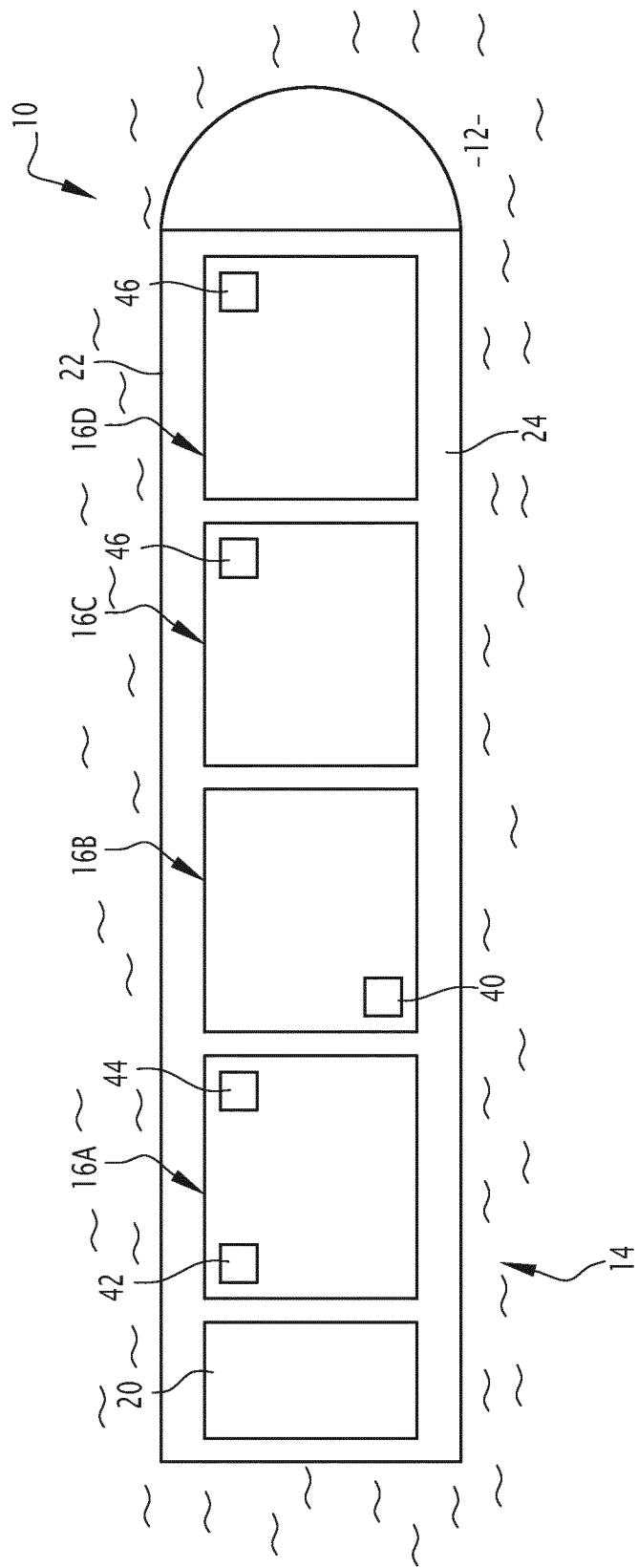
FIG. 8 is a view similar to FIG. 1 of a variant hydrocarbon production facility.

The facility 10 shown in FIG. 8 comprises at least three functional modules, here four functional modules 16A, 16B, 16C, 16D. A first functional module 16A comprises a power plant 42 and/or utilities 44, which are used by the other modules 16B, 16C, 16D.

The facility 10 further comprises a hot module 16B comprising at least one pretreatment unit 40, and cold modules 16C, 16D, each comprising at least one liquefaction unit 46.

In the example shown in FIG. 8, the facility 10 comprises at least two cold functional modules 16C, 16D each including at least one liquefaction unit 46.

Figure 9:
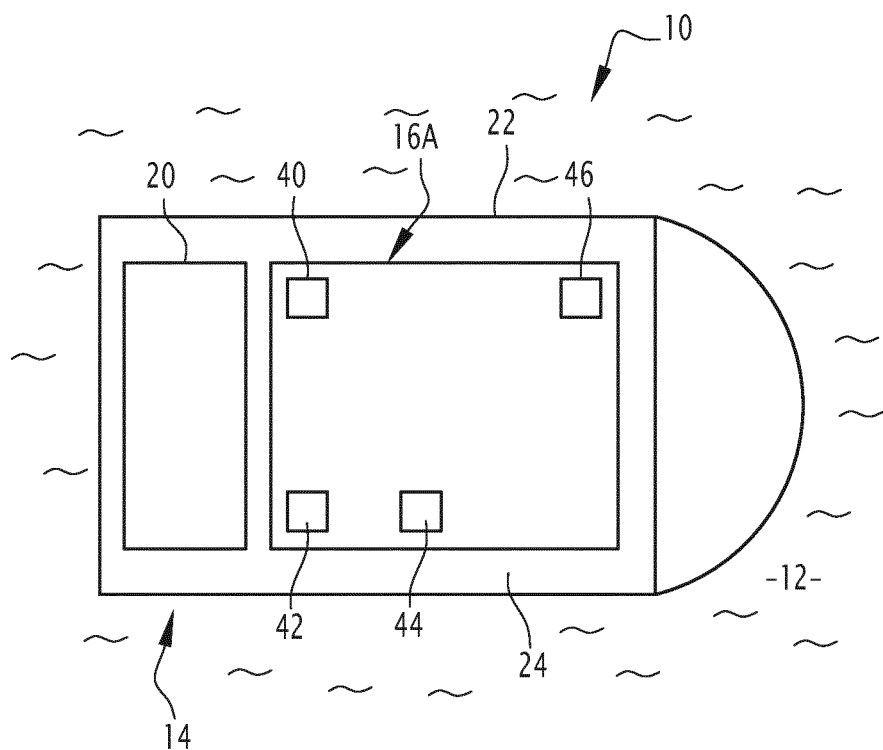
FIG. 9 is a view analogous to FIG. 1 of another variant hydrocarbon production facility.

In the embodiment shown in FIG. 9, the facility 10 comprises a single functional module 16A that comprises at least one pretreatment unit 40, at least one liquefaction unit 46, at least one power plant 42, at least one utility 44, and a storage management unit 48.

In one embodiment, the cold functional module 16B comprises a heavy extraction unit and/or a nitrogen rejection unit.

In another embodiment, at least one functional module 16A, 16B, advantageously a plurality or each functional module 16A, 16B, comprises a torch.

This embodiment minimizes the interconnections between the modules.

In another embodiment, not shown, the facility according to the invention is an onshore hydrocarbon production facility.

The facility is intended in particular for the exploitation of hydrocarbons such as oil or/and natural gas, the hydrocarbons being collected in the subsoil.

The facility is located in the vicinity of a body of water 12, for example, which is a lake, a sea or an ocean, for example. In particular, the facility is located within 10 km of the body of water. In this case, the facility comprises at least one pipe for taking water from the body of water 12 and possibly a pipe for discharging water heated in the facility into the body of water 12.

The cooling can be provided by direct heat exchange with water taken from the body of water 12 or by indirect heat exchange, via a closed loop of fresh water that is itself cooled by water from the body of water 12.

Rather than taking water from a body of water 12, an alternative is to provide a cooling system comprising a cooling water loop with ambient air. The cooling system comprises at least one air cooling tower (or cooling tower), for example, in which ambient air cools the water of the cooling loop.

For the examples described above, as before, the facility comprises at least one hybrid refrigeration system 34 having an air-cooled cooler 72 and a water-cooled cooler 74 in series.

Each cooler 72, 74 is intended to receive the flow to be cooled and to thermally exchange with that flow to cool it.

The air cooler 72 is thus suitable for making a gaseous flow circulate, in particular an air flow, to bring the gaseous flow circulating through the cooler 72 into a contactless heat exchange relationship with the flow to be cooled.

The water cooler 74 is suitable for bringing the flow circulating through the cooler 74 into a contactless heat exchange relationship with water taken from the body of water 12 or with cooling water from the ambient air-cooled cooling water loop.

The water supply may be dedicated to each module 16A, 16B.

As before, the construction and exploitation method of according to the invention comprises a step of verifying 102 the exploitation of the equipment 32 of the functional module 16A, 16B at the construction site of the facility. In particular, when the functional module 16A, 16B comprises a compressor 64, 66, 70, the compressor 64, 66, 70 is put into operation. A test fluid is passed through the compressor 64, 66, 70.

During this test, the control unit 78 controls each cooling system 34 to selectively activate the air cooler 72 without activating any water coolers 74. The water coolers 74 are not connected to the water expanse 12, nor to the cooling system comprising a cooling water loop with ambient air.

As before, the functional module 16A, 16B is placed on a support structure 14.

Advantageously, the support structure 14 is a floating transport barge intended for waterborne transport of the functional module 16A, 16B. In a variant, particularly for a smaller functional module 16A, 16B, the support structure 14 is a truck for land-based transportation of the module 16A, 16B.

Next, the method comprises a step 108 of moving the support structure 14 carrying each functional module 16A, 16B to an exploitation site on land.

The functional module 16A, 16B is then unloaded from the support structure 14 and assembled with at least one other functional module 16A, 16B to form the facility 10.

The facility 10 is then connected to a hydrocarbon source, such as hydrocarbon production wells located underground or hydrocarbon tanks.

The method then comprises an onshore hydrocarbon exploitation step 110.

In this exploitation step 110, each water cooler 74 is connected to the body of water 12 or cooling system comprising a cooling water loop with ambient air.

The control unit 78 controls each water cooler 74, to switch it to its hydrocarbon exploitation configuration in which it provides cooling by heat exchange with water from the body of water 12 or the cooling water loop.

This optionally precools the hydrocarbon flow and cools the cooling fluids 60, 62 exiting the respective compressors 66, 70 to liquefy the hydrocarbon flow.

The invention claimed is:

1. A method for constructing and exploiting a hydrocarbon production facility, comprising:
   supplying, at a construction site, at least one functional module comprising equipment including at least one hybrid cooler comprising an air cooler and a water cooler, the air cooler and the water cooler being mounted in series or in parallel;

verifying, onsite in a technical building operably coupled to and specific to the functional module, a functioning of the equipment of the at least one functional module, the onsite verifying comprising passing at least one test flow to be cooled through the air cooler of the hybrid cooler, the at least one test flow to be cooled being cooled exclusively by a flow of air circulating through the air cooler, without activation of a water cooler of the hybrid cooler, mounting the at least one functional module on a support structure;

moving the support structure carrying the functional module to an exploitation site;

upon verifying functioning of the equipment, conducting hydrocarbons exploiting, comprising passing at least one flow to be cooled through the water cooler, the at least one flow to be cooled by direct or indirect heat exchange with cooling water taken from a body of water or from a cooling system comprising a cooling water loop with ambient air, said cooling water circulating through the water cooler.

2. The method according to claim 1, wherein the direct heat exchange is a heat exchange without contact with said cooling water, or wherein the indirect heat exchange is performed via a closed loop of fresh water that is cooled by the cooling water.

3. The method according to claim 1, wherein, during hydrocarbons exploiting, the at least one flow to be cooled is cooled exclusively by the cooling water flowing through the water cooler, without cooling by an air flow flowing through the air cooler.

4. The method according to claim 1, wherein the at least one flow to be cooled is an exploited hydrocarbon flow or is a coolant flow, entering into a heat exchange relationship with an exploited hydrocarbon flow.

5. The method according to claim 1, wherein the functional module is a single functional module comprising at least one of a pretreatment unit, a power facility, utilities, a liquefaction unit, or a hydrocarbon storage management unit.

6. The method according to claim 1, wherein the hydrocarbon production facility comprises at least first and second functional modules, the method comprising mounting the first and second functional modules on the support structure, and connecting the first and second functional modules to each other by a connection interface comprising at least one connection line between the first and second functional modules, the connection line being at least one of an exploited fluid conveying line, an electrical power transfer line, a hydraulic fluid transfer line, or an information transfer line.

7. The method according to claim 6, wherein the connection interface comprises at most 50 connection lines.

8. The method according to claim 6, wherein the first functional module is a hot functional module, and the second functional module is a cold functional module connected to the first hot functional module.

9. The method according to claim 8, wherein the hot functional module comprises at least one of a hydrocarbon pretreatment unit, a power facility, or utilities.

10. The method according to claim 8, wherein the cold functional module comprises at least one of a liquefaction unit, or a hydrocarbon storage management unit.

11. The method according to claim 6, wherein each first and second functional module comprises at least one of a power facility, or utilities.

12. The method according to claim 1, wherein the hybrid cooler is connected to an outlet of a compressor configured to compress the at least one flow to be cooled, the method comprising, during the onsite verifying, the hydrocarbon exploiting, or both, compressing the at least one flow to be cooled in the compressor, prior to cooling the at least one flow to be cooled in the hybrid cooler.

13. The method according to claim 1, wherein the technical building is configured to specifically interact with the equipment of the functional module, and wherein the onsite verifying of the functioning of the equipment of the functional module includes activating the at least one technical building specific to the functional module.

14. The method according to claim 1, wherein the onsite verifying of the functioning of the equipment is performed prior to mounting the functional module on the support structure.

15. The method according to claim 1, wherein the hydrocarbon production facility is on a body of water, the support structure being at least partially submerged in the body of water, the moving of the support structure carrying the functional module being carried out on the body of water, the hydrocarbons exploiting being carried out on the body of water and comprising passing the at least one flow to be cooled through the water cooler, the flow being cooled by direct or indirect heat exchange with water taken from the body of water circulating through the water cooler.

16. The method according to claim 15, wherein the support structure comprises a hull, the facility being a Floating Production, Storage and Offloading (FPSO) or Floating Liquefied Natural Gas (FLNG), or wherein the support structure is a platform.

17. The method according to claim 1, wherein the hydrocarbon production facility is located onshore, in the vicinity of the body of water.

18. The method according to claim 1, wherein the at least one functional module comprises a torch.

19. A hydrocarbon production facility comprising:
a support structure;
at least one functional module having equipment including at least one hybrid cooler comprising an air-cooled cooler and a water-cooled cooler, the air-cooled cooler and the water-cooled cooler being mounted in series or in parallel, the at least one functional module being mounted on the support structure;
a flow supply configured to supply at least one test flow to be cooled to the at least one functional module, the test flow being configured to pass through either the water cooler, through the air cooler, or through each of the water and air cooler of the hybrid cooler;
a controller configured to control 1) the hybrid cooler, for verifying the functioning of the at least one functional module at a construction site in a technical building operably coupled to and specific to the functional module, in which the air cooler of the hybrid cooler is selectively activated to cool the at least one test flow to be cooled without activating a water cooler of the hybrid cooler, and 2) and a hydrocarbon exploitation configuration, wherein upon verification of the at least one functional module, at least one flow to be cooled passes through the water cooler and is cooled in the water cooler; and
the water cooler being connected to water from a body of water to make cooling water circulate from the body of water into the water cooler or being connected to cooling water from a cooling system comprising a cooling water loop with ambient air to make cooling water circulate from the cooling system into the water cooler.

20. The hydrocarbon production facility according to claim 19, located on a body of water, the hydrocarbon production facility being configured to carry out hydrocarbon exploitation on the body of water.

* * * * *